United States Patent
Merker et al.

(10) Patent No.: US 8,696,768 B2
(45) Date of Patent: Apr. 15, 2014

(54) METHOD FOR PRODUCING SOLID ELECTROLYTE CAPACITORS

(75) Inventors: Udo Merker, Köln (DE); Wilfried Loevenich, Bergisch-Gladbach (DE)

(73) Assignee: Heraeus Precious Metals GmbH & Co. KG (DE)

( * ) Notice: Subject to any disclaimer, the term of this patent is extended or adjusted under 35 U.S.C. 154(b) by 355 days.

(21) Appl. No.: 12/993,998

(22) PCT Filed: Apr. 22, 2009

(86) PCT No.: PCT/EP2009/054834
§ 371 (c)(1),
(2), (4) Date: Feb. 2, 2011

(87) PCT Pub. No.: WO2009/141209
PCT Pub. Date: Nov. 26, 2009

(65) Prior Publication Data
US 2011/0128675 A1 Jun. 2, 2011

(30) Foreign Application Priority Data
May 23, 2008 (DE) .......................... 10 2008 024 805

(51) Int. Cl.
*H01G 9/00* (2006.01)
*H01G 9/028* (2006.01)

(52) U.S. Cl.
CPC ............. *H01G 9/0036* (2013.01); *H01G 9/028* (2013.01)
USPC ....................................... 29/25.03

(58) Field of Classification Search
None
See application file for complete search history.

(56) References Cited

U.S. PATENT DOCUMENTS

| | | | |
|---|---|---|---|
| 3,538,395 | A | 11/1970 | Riley |
| 4,910,645 | A | 3/1990 | Jonas et al. |
| 5,300,575 | A | 4/1994 | Jonas et al. |
| 6,376,105 | B1 | 4/2002 | Jonas et al. |
| 6,987,663 | B2 | 1/2006 | Merker et al. |
| 7,563,290 | B2 | 7/2009 | Qiu et al. |
| 8,313,538 | B2 * | 11/2012 | Merker et al. ............... 29/25.03 |
| 2004/0062989 | A1 | 4/2004 | Ueno et al. |
| 2004/0074779 | A1 | 4/2004 | Sotzing |
| 2004/0136145 | A1 | 7/2004 | Sakai et al. |
| 2007/0064376 | A1 | 3/2007 | Merker et al. |
| 2008/0005878 | A1 | 1/2008 | Merker et al. |
| 2008/0010797 | A1 | 1/2008 | Qiu et al. |
| 2008/0247121 | A1 | 10/2008 | Qiu et al. |

FOREIGN PATENT DOCUMENTS

| | | |
|---|---|---|
| DE | 19627071 A1 | 1/1998 |
| EP | 0340512 A2 | 11/1989 |
| EP | 0440957 A2 | 8/1991 |
| EP | 1524678 A2 | 4/2005 |
| JP | 2003-100561 | 4/2003 |
| JP | 2008-078641 | 4/2008 |
| WO | WO-2007/031206 A1 | 3/2007 |
| WO | WO-2007/031207 A1 | 3/2007 |

* cited by examiner

*Primary Examiner* — Seahvosh Nikmanesh
(74) *Attorney, Agent, or Firm* — Novak Druce Connolly Bove + Quigg LLP (57) ABSTRACT

The invention relates to a process for producing electrolyte capacitors with high capacitances and low equivalent series resistance, to electrolyte capacitors produced by this process and to the use of such electrolyte capacitors.

15 Claims, 5 Drawing Sheets

METHOD FOR PRODUCING SOLID ELECTROLYTE CAPACITORS

CROSS-REFERENCE TO RELATED APPLICATIONS

This application is a national stage application (under 35 U.S.C. §371) of PCT/EP2009/054834, filed Apr. 22, 2009, which claims benefit of German application 10 2008 024 805.3, filed May 23, 2008.

BACKGROUND OF THE INVENTION

The invention relates to a process for producing electrolyte capacitors with high capacitances and low equivalent series resistance, to electrolyte capacitors produced by this process and to the use of such electrolyte capacitors.

A conventional solid electrolyte capacitor consists generally of a porous metal electrode, of an oxide layer disposed on the metal surface, an electrically conductive solid introduced into the porous structure, an outer electrode (contact connection), for example a silver layer or a metal foil with a separator, and also further electrical contacts and an encapsulation.

Examples of solid electrolyte capacitors are tantalum, aluminium, niobium and niobium oxide capacitors comprising charge transfer complexes or manganese dioxide or polymer-solid electrolytes. The use of porous bodies has the advantage that, owing to the large surface area, a very high capacitance density, i.e. a high electrical capacitance in a small space, can be achieved.

Particularly suitable solid electrolytes are, owing to their high electrical conductivity, $\pi$-conjugated polymers. $\pi$-conjugated polymers are also referred to as conductive polymers or as synthetic metals. They are gaining increasing economic significance, since polymers have advantages over metals with regard to processibility, to weight and to the controlled adjustment of properties by chemical modification. Examples of known $\pi$-conjugated polymers are polypyrroles, polythiophenes, polyanilines, polyacetylenes, polyphenylenes and poly(p-phenylene-vinylenes), a particularly important and industrially utilized polythiophene being poly-3,4-(ethylene-1,2-dioxy)thiophene, often also referred to as poly(3,4-ethylenedioxythiophene), since it, in its oxidized form, has a very high conductivity.

Practical development in electronics is increasingly requiring solid electrolyte capacitors with very low equivalent series resistances (ESR). The reasons for this are, for example, falling logic voltages, a higher integration density and rising clock frequencies in integrated circuits. Moreover, a low ESR also lowers the power consumption, which is advantageous particularly for mobile, battery-operated applications. There is therefore the desire to reduce the ESR of solid electrolyte capacitors as far as possible.

European Patent EP-A 340 512 describes the production of a solid electrolyte from 3,4-ethylene-1,2-dioxythiophene and the use of the cationic polymers thereof, prepared by oxidative polymerization, as a solid electrolyte in electrolyte capacitors. Poly(3,4-ethylenedioxythiophene), as a replacement for manganese dioxide or for charge transfer complexes in solid electrolyte capacitors, lowers the equivalent series resistance of the capacitor and improves the frequency behaviour owing to the higher electrical conductivity.

A disadvantage of this and similar processes is that the conductive polymer is obtained by polymerization in situ in the electrolyte capacitor. To this end, the monomer, for example 3,4-ethylene-1,2-dioxythiophene, and oxidizing agent have to be introduced into the porous metal body together or successively in the presence of solvents, and then polymerized. Such a chemical reaction is, however, undesired in the course of production of electronic components, since it is very difficult always to allow the chemical reaction to proceed identically in millions of small porous components, in order to produce capacitors of identical specification.

Another disadvantage of in situ polymerizations in the production of solid electrolytes for capacitors is that the oxidizing agents can damage the dielectric (oxide layer) on the metal electrode. The oxidizing agents used are generally transition metal salts, for example Fe(III) salts. The reaction products of the polymerization which remain in the electrode body after the polymerization are then not just the electrically conductive polymer but also the reduced metal salts, for example Fe(II) salts. It is possible to attempt to remove these salts by subsequent washing steps. However, this is complex and does not succeed completely, i.e. residues of the metal salts always remain in the electrode body. As is well known, transition metals in particular can damage the dielectric, such that the elevated leakage currents resulting therefrom significantly reduce the lifetime of the capacitors or even make it impossible to use the capacitors under harsh conditions, such as high temperatures and/or high air humidity.

Furthermore, the production process of solid electrolyte capacitors when an in situ polymerization is employed is very complex: a polymerization process (impregnation, polymerization, washing) generally last several hours, it is necessary under some circumstances to use potentially explosive or toxic solvents here, and very many polymerization processes are required in order to produce a solid electrolyte.

Monomers can also be polymerized electrochemically in the absence of oxidizing agents. However, the electrochemical polymerization requires that a conductive film is first deposited on the insulating oxide layer of the metal electrode. This then again requires an in situ polymerization with all the disadvantages detailed above. Finally, this layer then has to be provided with electrical contacts for each individual metal electrode. This contact connection is very costly and inconvenient in mass production and can damage the oxide layer. Furthermore, electrochemical deposition in the pores of the porous metal electrode is very difficult, since the deposition takes place primarily on the outside of the electrode body owing to the electrical potential profile.

In PCT application WO-A1-2007/031206, the solid electrolyte of an electrolyte capacitor is produced by means of a dispersion comprising particles of poly(3,4-ethylenedioxythiophene)/polystyrenesulfonate with a mean diameter of 1-100 nm Even though this process overcomes the above-described disadvantages of the in situ polymerization, the process is found to be too complex. For example, the dispersion in WO A1 2007/031206 has to be rinsed off the outer surface of the electrode body again after the impregnation, in order to achieve a higher coverage and a lower ESR. This leads to considerable material losses and an expensive production process.

There was thus a need to improve the process described in WO-A1-2007/031206 for producing solid electrolyte capacitors in such a way that better coverages with solid electrolyte and hence higher capacitances are achieved in a simpler process.

BRIEF SUMMARY OF THE INVENTION

It was therefore an object of the invention to provide such a process and the capacitors improved thereby.

It has now been found that, surprisingly, by means of dispersions which comprise electrically conductive polythiophenes and whose viscosity increases to a lesser degree when the solids content is increased, it is possible to produce solid electrolytes for capacitors, which achieve a significantly improved degree of coverage with solid electrolyte and hence higher capacitances, and are simultaneously easier to apply.

The dependence of the viscosity on the solids content surprisingly has a very great influence on the degree of coverage of the porous electrode body with the solid electrolyte. With dispersions whose viscosity increases to a lesser degree when solvent is removed, as occurs in the course of drying, it is possible to achieve significantly higher degrees of coverage of the solid electrolyte than with dispersions whose viscosity increases significantly. This is especially surprising since even dispersions whose viscosities and solids contents do not differ on application to the electrode body lead to different degrees of coverage when the viscosities of the dispersions rise to different degrees with the solids content.

The present invention therefore provides a process for producing an electrolyte capacitor, at least comprising, that a) a porous body, at least comprising onto a porous electrode body (2) of an electrode material and a dielectric (3) which covers the surface of this electrode material, is applied a dispersion A)

which comprises at least particles B) of an electrically conductive polythiophene which is optionally substituted and a dispersant D), b) and a solid electrolyte (4) which partly or fully covers the dielectric surface is formed by at least partly removing the dispersant D), characterized in that, for the dispersion A), the integral of the viscosity, which is represented as a function of the solids content, in the integration range from 0.4% solids to 5% solids, is less than 2500 mPas %, preferably less than 2000 mPas %, more preferably less than 1500 mPas %, even more preferably less than 1100 mPas % and exceptionally preferably less than 600 mPas %, wherein the viscosity is determined with a rheometer in mPas at 20° C. and a shear rate of 100 s$^{-1}$, and the solids content is determined in percent.

DETAILED DESCRIPTION OF THE INVENTION

Figure 1:
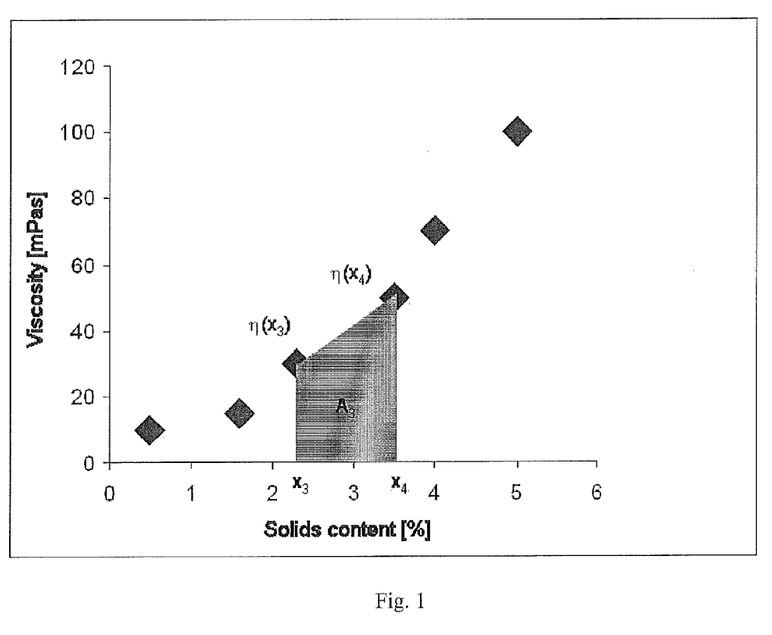
FIG. 1 shows the trapezoidal area $A_3$ using one example according to the invention.

The integral of the viscosity as a function of the solids content is determined as follows: first the viscosity of the dispersion is determined at different solids contents in the range of 0.4% to 5% with a rheometer in mPas at 20° C. and a shear rate of 100 s$^{-1}$. To this end, the solids content is altered via addition or evaporation of the dispersant. In order to determine the integral with sufficient accuracy, the viscosity is determined at least for one solids content for each of the percentage ranges of 0.4% to less than 1%, 1% to less than 2%, 2% to less than 3%, 3% to less than 4%, 4% to less than 5% and 5%. The integral of the viscosity in the integration range of 0.4% to 5% is calculated from the viscosity values for a given solids content by known rules of mathematics. This can be done, for example, by means of the trapezoidal rule: when the viscosity h is determined, for example, for one solids content $x_i$ each from the above six percentage ranges, the area $A_i$ of the trapezium between two adjacent values $h(x_i)$ and $h(x_{i+i})$ is calculated by means of the formula:

$$A_i = \frac{x_{i+1} - x_i}{2} * (\eta(x_i) + \eta(x_{i+1}))$$

The integral I is then calculated from the sum of the individual trapezoidal areas:

$$I = \sum_{i=1}^{5} A_i$$

FIG. 1 shows the trapezoidal area $A_3$ using one example.

The particles B) of the dispersion A) have a specific electrical conductivity of greater than 100 S/cm in the dry state.

The specific electrical conductivity of the particles B) in the dry state is the specific electrical conductivity of the film in the dry state which forms from the particles B) as the dispersion A) dries.

Preference is given to using dispersions A) whose particles B) in the dried state have a specified electrical conductivity of greater than 150 S/cm, more preferably greater than 200 S/cm, even more preferably greater than 250 S/cm, exceptionally preferably greater than 300 S/cm and in a particularly preferred embodiment greater than 400 S/cm.

The viscosity of dispersion A) may, according to the method of application, be between 0.1 and 1000 mPas (measured with a rheometer at 20° C. and a shear rate of 100 s$^{-1}$). The viscosity is preferably 0.1 to 500 mPas, more preferably between 1 and 200 mPas, most preferably 1 to 100 mPas, exceptionally preferably 1 to 50 mPas and in a particularly preferred embodiment 1 to 30 mPas.

The solids content of dispersion A) is 0.1-90% by wt., preferably 0.1-30% by wt., most preferably 0.3-10% by wt., exceptionally preferably 0.5-5% by wt.

The solids content is determined by drying dispersion A) at a temperature which is high enough to remove the dispersant but does not decompose the solid in doing so.

In the process, particles B) of the conductive polythiophene in dispersion A) have a mean diameter of 1 to 100 nm, preferably a mean diameter of 1 to 80 nm, more preferably of 1 to 50 nm, most preferably of 5 to 40 nm.

The diameter of particles B) is determined by means of ultracentrifuge analysis. The general method is described in Colloid Polym. Sci. 267, 1113-1116 (1989). In the case of particles B) which swell in the dispersion, the particle size in the swollen state is determined. A diameter distribution of particles B) refers to a mass distribution of the particles in the dispersion as a function of the particle diameter.

In the process, particles B) of the conductive polymer in dispersion A) preferably have a $d_{90}$ value of the diameter distribution of less than 150 nm, particularly preferably less than 100 nm, more particularly preferably less than 80 nm and yet more preferably less than 50 nm.

In the process, particles B) of the conductive polymer in dispersion A) preferably have a $d_{10}$ value of the diameter distribution greater than 1 nm, particularly preferably greater than 3 nm, more particularly preferably greater than 5 nm.

The $d_{10}$ value of the diameter distribution means that 10% of the total mass of all particles B) of the conductive polymer in dispersion A) can be attributed to those particles B) which possess a diameter less than or equal to the $d_{10}$ value. The $d_{90}$ value of the diameter distribution means that 90% of the total mass of all particles B) of the conductive polymer in dispersion A) can be attributed to those particles B) which possess a diameter less than or equal to the $d_{90}$.

Dispersion A) preferably contains no or only small amounts of metals and transition metals. Metals are understood here to mean metals or metal ions of main group or transition group metals, the latter also being referred to hereinafter as transition metals, of the Periodic Table of the elements. As is well known, transition metals in particular can damage the dielectric, and so the resulting increased leakage currents can significantly reduce the lifetime of the capacitors or even make impossible a use of the capacitors under harsh conditions, such as high temperatures and/or high atmospheric humidity.

Dispersion A) in the process preferably has a metals content of less than 5000 mg/kg, more preferably less than 1000 mg/kg, yet more preferably less than 200 mg/kg. Metals here include, for example, Na, K, Mg, Al, Ca, Fe, Cr, Mn, Co, Ni, Cu, Ru, Ce or Zn.

Dispersion A) in the process preferably has a content of transition metals of less than 1000 mg/kg, more preferably less than 100 mg/kg, most preferably less than 20 mg/kg. Transition metals here are, for example, Fe, Cu, Cr, Mn, Ni, Ru, Ce, Zn or Co.

Dispersion A) in the process preferably has an iron content less than 1000 mg/kg, more preferably less than 100 mg/kg, most preferably less than 20 mg/kg.

The low concentrations of metals in the dispersions have the great advantage that the dielectric is not damaged in the course of formation of the solid electrolyte and in the later operation of the capacitor.

In the electrolyte capacitor produced by the process according to the invention, the electrode material forms a porous body of high surface area, and is present, for example, in the form of a porous sintered body or of a roughened film. This porous body is also referred to hereinafter as an electrode body for short.

The electrode body covered with a dielectric is also referred to hereinafter as an oxidized electrode body. The term "oxidized electrode body" also encompasses those electrode bodies which are covered with a dielectric which has not been produced by oxidizing the electrode body.

The electrode body covered with a dielectric and completely or partly with a solid electrolyte is also referred to hereinafter as capacitor body for short.

"Outer surface of the capacitor body" is understood to mean the outer surfaces of the capacitor body.

Conductive polythiophenes belong to the class of the π-conjugated polymers which, after oxidation or reduction, possess electrical conductivity. Conductive polythiophenes are preferably understood to mean those polythiophenes which, after oxidation, possess an electrical conductivity in the order of magnitude of at least 1 μS cm$^{-1}$.

The particles B) of the electrically conductive polythiophene in dispersion A) preferably comprise at least one polythiophene with repeat units of the general formula (I) or of the general formula (II) or of the general formula (X) or repeat units of the formulae (I) and (II) or repeat units of the formulae (I) and (X) or repeat units of the formulae (II) and (X) or repeat units of the formulae (I), (II) and (X)

(I)

(II)

(X)

in which

A is an optionally substituted $C_1$-$C_5$-alkylene radical,

R is, independently of each other, H, a linear or branched, optionally substituted $C_1$-$C_{18}$-alkyl radical, an optionally substituted $C_5$-$C_{12}$-cycloalkyl radical, an optionally substituted $C_6$-$C_{14}$-aryl radical, an optionally substituted $C_7$-$C_{18}$-aralkyl radical, an optionally substituted $C_1$-$C_4$-hydroxyalkyl radical or a hydroxyl radical, x is an integer of 0 to 8 and, in the case that a plurality of R radicals is bonded to A, they may be the same or be different.

The general formulae (I) and (II) should be understood such that x substituents R may be bonded to the alkylene radical A.

Particular preference is given to polythiophenes with repeat units of the general formula (I) or (II) or repeat units of the general formula (I) and (II), in which A is an optionally substituted $C_2$-$C_3$-alkylene radical and x is 0 or 1.

Very particular preference is given, as the conductive polythiophene of the particles B), to poly(3,4-ethylenedioxythiophene), which is optionally substituted.

In the context of the invention, the prefix "poly-" should be understood to mean that more than one identical or different repeat unit is present in the polythiophene. The polythiophenes contain a total of n repeat units of the general formula (I) or of the general formula (II) or of the general formula (X) or of the general formulae (I) and (II) or of the general formulae (I) and (X) or of the general formulae (II) and (X) or of the general formulae (I), (II) and (X), where n is an integer of 2 to 2000, preferably 2 to 100. The repeat units of the general formula (I) or of the general formula (II) or of the general formula (X) or the repeat units of the general formulae (I) and (II) or the repeat units of the general formulae (I) and (X) or the repeat units of the general formulae (II) and (X) or the repeat units of the general formulae (I), (II) and (X) may each be the same or different within a polythiophene. Preference is given to polythiophenes having in each case identical repeat units of the general formula (I) or of the general formula (II) or of the general formula (X) or having in each case identical repeat units of the general formulae (I) and (II), or of the general formulae (I) and (X), or of the general formulae (II) and (X), or having in each case identical repeat units of the general formulae (I), (II) and (X). Particular preference is given to polythiophenes having in each case identical repeat units of the general formula (I) or of the general formula (II) or having in each case identical repeat units of the general formulae (I) and (II).

On the end groups, the polythiophenes preferably each bear H.

In the context of the invention, $C_1$-$C_5$-alkylene radicals A are preferably methylene, ethylene, n-propylene, n-butylene or n-pentylene. $C_1$-$C_{18}$-Alkyl R is preferably linear or branched $C_1$-$C_{18}$-alkyl radicals such as methyl, ethyl, n- or isopropyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-etradecyl, n-hexadecyl or n-octadecyl, $C_5$-$C_{12}$-cycloalkyl radicals R are, for example, cyclopentyl, cyclohexyl, cycloheptyl, cyclooctyl, cyclononyl or cyclodecyl, $C_6$-$C_{14}$-aryl radicals R are, for example, phenyl or naphthyl, and $C_7$-$C_{18}$-aralkyl radicals R are, for example, benzyl, o-, m-, p-tolyl, 2,3-, 2,4-, 2,5-, 2,6-, 3,4-, 3,5-xylyl or mesityl. The above list serves to illustrate the invention by way of example and should not be considered to be exclusive.

In the context of the invention, any further substituents of the A radicals and/or of the R radicals include numerous organic groups, for example alkyl, cycloalkyl, aryl, aralkyl, alkoxy, halogen, ether, thioether, disulphide, sulphoxide, sulphone, sulphonate, amino, aldehyde, keto, carboxylic ester, carboxylic acid, carbonate, carboxylate, cyano, alkylsilane and alkoxysilane groups, and also carboxamide groups.

The scope of the invention encompasses all radical definitions, parameters and elucidations above and specified below, in general or within preferred ranges, with one another, i.e. including any combinations between the particular ranges and preferred ranges.

The polythiophenes used as the solid electrolyte in the preferred process may be uncharged or cationic. In preferred embodiments, they are cationic, "cationic" relating only to the charges which reside on the main polythiophene chain. According to the substituent on the R radicals, the polythiophenes may bear positive and negative charges in the structural unit, in which case the positive charges are on the main polythiophene chain and the negative charges are, if present, on the R radicals substituted by sulphonate or carboxylate groups. The positive charges of the main polythiophene chain may be partly or fully saturated by the anionic groups which may be present on the R radicals. Viewed overall, the polythiophenes in these cases may be cationic, uncharged or even anionic. Nevertheless, in the context of the invention, all are considered to be cationic polythiophenes, since the positive charges on the main polythiophene chain are decisive. The positive charges are not shown in the formulae, since their exact number and position cannot be stated unambiguously. The number of positive charges is, however, at least 1 and at most n, where n is the total number of all repeat units (identical or different) within the polythiophene.

To balance the positive charge, if this has not already been done by the optionally sulphonate- or carboxylate-substituted and thus negatively charged R radicals, the cationic polythiophenes require anions as counterions.

Counterions may be monomeric or polymeric anions, the latter also being referred to hereinafter as polyanions.

Polymeric anions are preferred over monomeric anions, since they contribute to film formation and, owing to their size, lead to thermally more stable, electrically conductive films.

Polymeric anions here may, for example, be anions of polymeric carboxylic acids, such as polyacrylic acids, polymethacrylic acid or polymaleic acids, or polymeric sulphonic acids, such as polystyrenesulphonic acids and polyvinylsulphonic acids. These polycarboxylic and -sulphonic acids may also be copolymers of vinylcarboxylic and vinylsulphonic acids with other polymerizable monomers, such as acrylic esters and styrene.

A preferred polymeric anion in the particles B) mentioned is an anion of a polymeric carboxylic or sulphonic acid.

A particularly preferred polymeric anion is the anion of polystyrenesulphonic acid (PSS).

The molecular weight of the polyacids which afford the polyanions is preferably 1000 to 2 000 000, more preferably 2000 to 500 000. The polyacids or alkali metal salts thereof are commercially available, for example polystyrenesulphonic acids and polyacrylic acids, or else are preparable by known processes (see, for example, Houben Weyl, Methoden der organic Chemie [Methods of Organic Chemistry], vol. E 20 Makromolekulare Stoffe [Macromolecular Substances], part 2, (1987), p. 1141 ff.).

Polymeric anion(s) and electrically conductive polymers may be present in dispersion A) especially in a weight ratio of 0.5:1 to 50:1, preferably of 1:1 to 30:1, more preferably 2:1 to 20:1. The weight of the electrically conductive polymers corresponds here to the initial weight of the monomers used, assuming that there is full conversion in the polymerization.

The monomeric anions used are, for example, those of $C_1$-$C_{20}$-alkanesulphonic acids, such as those of methanesulphonic acid, ethanesulphonic acid, propanesulphonic acid, butanesulphonic acid or higher sulphonic acids such as dodecanesulphonic acid, of aliphatic perfluorosulphonic acids, such as trifluoromethanesulphonic acid, perfluorobutanesulphonic acid or perfluorooctanesulphonic acid, of aliphatic $C_1$-$C_{20}$-carboxylic acids such as 2-ethylhexylcarboxylic acid, of aliphatic perfluorocarboxylic acids, such as trifluoroacetic acid or perfluorooctanoic acid, and aromatic sulphonic acids optionally substituted by $C_1$-$C_{20}$-alkyl groups, such as benzenesulphonic acid, o-toluenesulphonic acid, p-toluenesulphonic acid or dodecylbenzenesulphonic acid, and of cycloalkanesulphonic acids such as camphorsulphonic acid, or tetrafluoroborates, hexafluorophosphates, perchlorates, hexafluoroantimonates, hexafluoroarsenates or hexachloroantimonates.

Preferred monomeric anions are the anions of p-toluenesulphonic acid, methanesulphonic acid or camphorsulphonic acid.

Cationic polythiophenes which contain anions as counterions to balance the charge are often also referred to in the technical field as polythiophene/(poly)anion complexes.

Dispersion A) may comprise one or more dispersants D). The following solvents are mentioned as Examples of dispersants D): aliphatic alcohols such as methanol, ethanol, i-propanol and butanol; aliphatic ketones such as acetone and methyl ethyl ketone; aliphatic carboxylic esters such as ethyl acetate and butyl acetate; aromatic hydrocarbons such as toluene and xylene; aliphatic hydrocarbons such as hexane, heptane and cyclohexane; chlorohydrocarbons such as dichloromethane and dichloroethane; aliphatic nitriles such as acetonitrile, aliphatic sulphoxides and sulphones such as dimethyl sulphoxide and sulpholane; aliphatic carboxamides such as methylacetamide, dimethylacetamide and dimethylformamide; aliphatic and araliphatic ethers such as diethyl ether and anisole. In addition, it is also possible to use water or a mixture of water with the aforementioned organic solvents as dispersant D).

Preferred dispersants D) are water or other protic solvents such as alcohols, for example methanol, ethanol, i-propanol and butanol, and also mixtures of water with these alcohols, the particularly preferred solvent being water.

Dispersion A) may also comprise further substances such as surface-active substances, for example ionic and/or nonionic surfactants; adhesion promoters, for example organofunctional silanes or hydrolysates thereof, e.g. 3-glycidoxypropyltrialkoxysilane, 3-aminopropyltriethoxysilane, 3-mercaptopropyltrimethoxysilane, 3-methacryloyloxypropyltrimethoxysilane, vinyltrimethoxysilane or octyltriethoxysilane; crosslinkers such as melamine compounds, capped isocyanates, functional silanes—e.g. tetraethoxysilane, alkoxysilane-hydrolysates, for example based on tetraethoxysilane, epoxysilanes such as 3-glycidoxypropyltrialkoxysilane-polyurethanes, polyacrylates or polyolefin dispersions, or further additives.

Dispersions A) preferably comprise further additives which enhance the conductivity, for example compounds containing ether groups, for example tetrahydrofuran; compounds containing lactone groups, such as γ-butyrolactone, γ-valerolactone; compounds containing amide or lactam groups, such as caprolactam, N-methylcaprolactam, N,N-dimethylacetamide, N-methylacetamide, N,N-dimethylformamide (DMF), N-methylformamide, N-methylformanilide, N-methylpyrrolidone (NMP), N-octylpyrrolidone, pyrrolidone; sulphones and sulphoxides, for example sulpholane (tetramethylenesulphone), dimethyl sulphoxide (DMSO); sugars or sugar derivatives, for example sucrose, glucose, fructose, lactose, sugar alcohols, for example sorbitol, mannitol; imides, for example succinimide or maleimide; furan derivatives, for example 2-furancarboxylic acid, 3-furancarboxylic acid, and/or di- or polyalcohols, for example ethylene glycol, glycerol or di- or triethylene glycol. Particular preference is given to using, as conductivity-enhancing additives, tetrahydrofuran, N-methylformamide, N-methylpyrrolidone, ethylene glycol, dimethyl sulphoxide or sorbitol. The further additives may be present either in each case alone or in any desired combination thereof in dispersion A).

Dispersions A) may additionally comprise one or more binders. Preference is given to polymeric, organic binders such as, for example, polyvinyl alcohols, polyvinylpyrrolidones, polyvinyl chlorides, polyvinyl acetates, polyvinyl butyrates, polyacrylic esters, polyacrylamides, polymethacrylic esters, polymethacrylamides, polyacrylonitriles, styrene/acrylic ester, vinyl acetate/acrylic ester and ethylene/vinyl acetate copolymers, polybutadienes, polyisoprenes, polystyrenes, polyethers, polyesters, polycarbonates, polyurethanes, polyamides, polyimides, polysulphones, melamine-formaldehyde resins, epoxy resins, silicone resins or celluloses. In addition, preferred polymeric organic binders also include those which are obtained by adding crosslinkers, for example melamine compounds, capped isocyanates or functional silanes, for example 3-glycidoxypropyltrialkoxysilane, tetraethoxysilane and tetraethoxysilane hydrolysate, or crosslinkable polymers, for example polyurethanes, polyacrylates or polyolefins, and subsequent crosslinking. Such crosslinking products suitable as polymeric binder may also be formed, for example, by reaction of the crosslinkers added with polymeric anions which may also be present in dispersion A). Preference is given to those binders which have sufficient thermal stability to withstand the thermal stresses to which the finished capacitors are exposed to later, for example soldering temperatures of 220 to 260° C.

The solids content of the polymeric binder in dispersion A) is 0.1-90 percent by weight (% by wt.), preferably 0.5 to 30% by wt. and most preferably 0.5 to 10% by wt.

Dispersions A) may have a pH of 1 to 14, preference being given to a pH of 1 to 8. For corrosion-sensitive dielectrics, for example aluminium oxides or niobium oxides, preference is given to dispersions having a pH of 3 to 8, in order not to damage the dielectric.

To establish the pH, it is possible to add, for example, acids or bases to the dispersions. Preference is given to those additives which do not impair the film formation of the dispersion and are nonvolatile at relatively high temperatures, for example soldering temperatures, but rather remain under these conditions in the solid electrolyte, for example the bases 2-dimethylaminoethanol, 2,2'-iminodiethanol or 2,2',2''-nitrilotriethanol and the acid polystyrenesulphonic acid.

Figure 2:
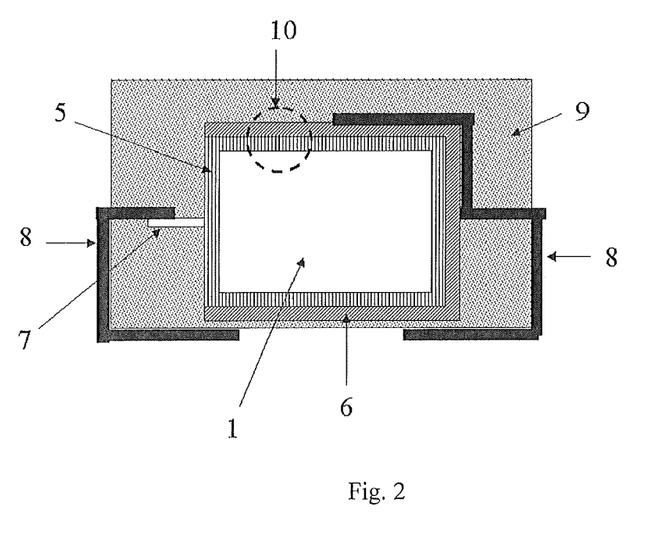
FIG. 2 describes a schematic illustration of the construction of a solid electrolyte capacitor using the example of a tantalum capacitor.

FIG. 2 describes a schematic illustration of the construction of a solid electrolyte capacitor using the example of a tantalum capacitor comprising

| 1  | capacitor body |
| 5  | optional conductive outer layer |
| 6  | graphite/silver layer |
| 7  | wire contact to electrode body 2 |
| 8  | outer contacts |
| 9  | encapsulation |
| 10 | detail |

Figure 3:
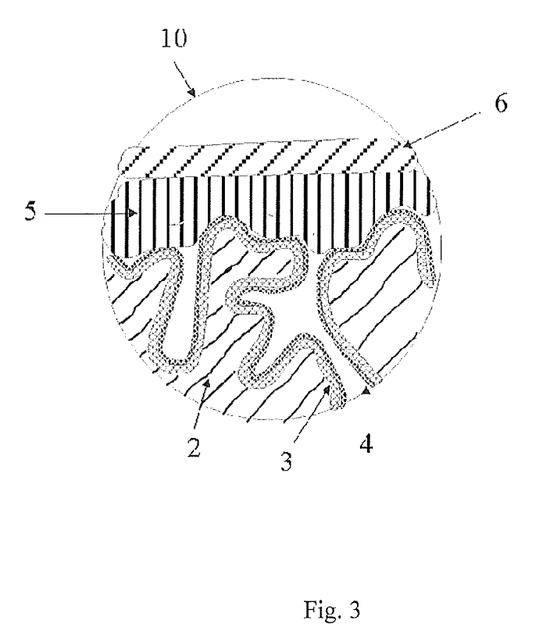
FIG. 3 describes the enlarged detail from FIG. 2 of the schematic layer structure of the tantalum capacitor.

FIG. 3 describes the enlarged detail 10 from FIG. 2 of the schematic layer structure of the tantalum capacitor comprising

| 10 | detail |
| 2  | porous electrode body (anode) |
| 3  | dielectric |
| 4  | solid electrolyte (cathode) |
| 5  | optional conductive outer layer |
| 6  | graphite/silver layer. |

Figure 4:
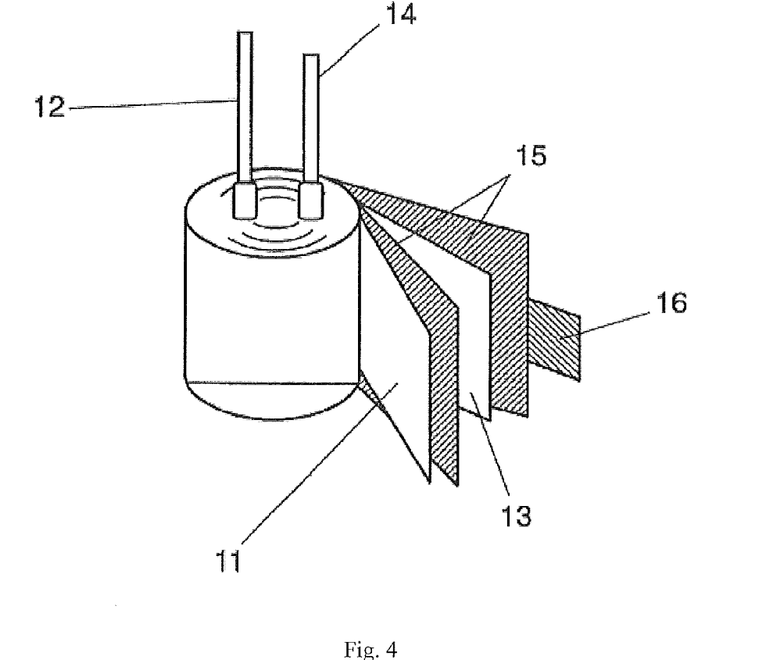
FIG. 4 describes a schematic illustration of the construction of a solid electrolyte capacitor using the example of an aluminum wound capacitor.

FIG. 4 describes a schematic illustration of the construction of a solid electrolyte capacitor using the example of an aluminium wound capacitor comprising

| 11 | porous anode film |
| 12 | contact wire for anode film |
| 13 | cathode film |
| 14 | contact wire for cathode film |
| 15 | separator |
| 16 | adhesive tape |

In principle, such an inventive electrolyte capacitor can be produced as follows: first, for example, a valve metal powder with a high surface area is compressed and sintered to a porous electrode body. When this is done, an electrical contact wire, preferably of a valve metal, for example tantalum, is typically also compressed into the electrode body. It is alternatively also possible to etch metal foils in order to obtain a porous film. In the case of a wound capacitor, a porous anode film which forms the electrode body and a cathode film are separated by a separator and wound up.

The electrode body is then, for example, coated by electrochemical oxidation with a dielectric, i.e. an oxide layer.

Thereafter, in accordance with the invention, a dispersion A) comprising at least particles B) of an electrically conductive polythiophene and a dispersant D) is applied to the oxidized electrode body and the solid electrolyte is formed by at least partly removing the dispersant D). If appropriate, further layers (referred to as conductive outer layer (5) in FIG. 2 and FIG. 3) are applied to the outer surface of the capacitor body. A coating with layers of good conductivity, such as graphite and silver, or a metallic cathode body with separator, as, for example, in the case of wound aluminium capacitors, serves as the electrode for discharging the current. Finally, the capacitor is optionally contact-connected and finally encapsulated.

Additionally preferred is a process for producing electrolyte capacitors, characterized in that the electrode material is a valve metal or a compound with electrical properties comparable to a valve metal.

In the context of the invention, valve metals are understood to mean those metals whose oxide layers do not enable current flow in both directions equally: in the case of anodic voltage, the oxide layers of the valve metals block current flow, whereas cathodic voltage results in large currents which can destroy the oxide layer. The valve metals include Be, Mg, Al, Ge, Si, Sn, Sb, Bi, Ti, Zr, Hf, V, Nb, Ta and W, and also an alloy or compound of at least one of these metals with other elements. The best known representatives of the valve metals are Al, Ta, and Nb. Compounds with electrical properties comparable to a valve metal are those which have metallic conductivity, which are oxidizable and whose oxide layers have the above-described properties. For example, NbO possesses metallic conductivity, but is generally not considered to be a valve metal. Layers of oxidized NbO, however, have the typical properties of valve metal oxide layers, and so NbO or an alloy or compound of NbO with other elements are typical examples of such compounds with electrical properties comparable to a valve metal.

Preference is given to electrode materials composed of tantalum, aluminium and those electrode materials based on niobium or niobium oxide.

Electrode materials based on niobium or niobium oxide are understood to mean those materials in which niobium or niobium oxide constitutes the component with the greatest quantitative proportion.

The electrode material based on niobium or niobium oxide is preferably niobium, NbO, a niobium oxide $NbO_x$ where x may assume values of 0.8 to 1.2, niobium nitride, niobium oxynitride or mixtures of these materials, or an alloy or compound of at least one of these materials with other elements.

Preferred alloys are alloys with at least one valve metal, for example Be, Mg, Al, Ge, Si, Sn, Sb, Bi, Ti, Zr, Hf, V, Nb, Ta or W.

Accordingly, the term "oxidizable metal" means not just metals, but also an alloy or compound of a metal with other elements, provided that they possess metallic conductivity and are oxidizable.

The oxidizable metals are, for example, sintered in powder form to a porous electrode body, or a porous structure is imparted to a metallic body. The latter can be done, for example, by etching a film.

The porous electrode bodies are oxidized, for example, in a suitable electrolyte, for example phosphoric acid, by applying a voltage. The magnitude of this forming voltage depends on the oxide layer thickness to be achieved and/or the later application voltage of the capacitor. Preferred forming voltages are 1 to 800 V, more preferably 1 to 300 V.

To produce the electrode body, metal powders with a specific charge of 1000 to 1 000 000 µC/g are preferred, more preferably with a specific charge of 5000 to 500 000 µC/g, even more preferably with a specific charge of 5000 to 300000 µC/g, exceptionally preferably with a specific charge of 10000 to 200000 µC/g, are used.

The specific charge of the metal powder is calculated as follows:

specific charge of the metal powder=(capacitance× anodization voltage)/weight of the oxidized electrode body.

The capacitance is determined from the capacitance of the oxidized electrode body measured at 120 Hz in an aqueous electrolyte. The electrical conductivity of the electrolyte is sufficiently great that, at 120 Hz, there is not yet a decline in the capacitance owing to the electrical resistivity of the electrolyte. For example, 18% aqueous sulphuric acid electrolytes are used for the measurement.

The electrode bodies used have a porosity of 10 to 90%, preferably of 30 to 80%, more preferably of 50 to 80%.

The porous electrode bodies have a mean pore diameter of 10 to 10 000 nm, preferably of 50 to 5000 nm, more preferably of 100 to 3000 nm.

Accordingly, the present invention more preferably provides a process for producing electrolyte capacitors, characterized in that the valve metal or the compound of electrical properties comparable to a valve metal is tantalum, niobium, aluminium, titanium, zirconium, hafnium, vanadium, an alloy or compound of at least one of these metals with other elements, NbO or an alloy or compound of NbO with other elements.

The dielectric preferably consists of an oxide of the electrode material. It optionally comprises further elements and/or compounds.

The capacitance of the capacitor depends, as well as on the type of dielectric, on the surface area and the thickness of the dielectric. The specific charge is a measure of how much charge per unit weight the oxidized electrode body can accommodate. The specific charge is calculated as follows:

specific charge of the capacitor=(capacitance× rated voltage)/weight of the oxidized electrode body.

The capacitance is determined from the capacitance of the finished capacitor measured at 120 Hz and the rated voltage is the specified use voltage of the capacitor. The weight of the oxidized electrode body is based on the simple weight of the dielectric-coated porous electrode material without polymer, contacts and encapsulations.

The electrolyte capacitors produced by the novel process preferably have a specific charge of 500 to 500 000 µC/g, more preferably a specific charge of 2500 to 250 000 µC/g, even more preferably a specific charge of von 2500 to 150 000 µC/g, exceptionally preferably a specific charge of 5000 to 100 000 µC/g.

Precursors for the preparation of conductive polythiophenes of the particles B) in dispersion A), also referred to hereinafter as precursors, are understood to mean appropriate monomers or derivatives thereof. It is also possible to use mixtures of different precursors. Suitable monomeric precursors are, for example, optionally substituted thiophenes, preferably optionally substituted 3,4-alkylenedioxythiophenes, 3,4-alkyleneoxythiathiophenes or thieno[3,4-b]thiophenes.

Examples of optionally substituted 3,4-alkylenedioxythiophenes, 3,4-alkyleneoxythiathiophenes or thieno[3,4-b]thiophenes include the compounds of the general formula (III) or of the general formula (IV) or of the general formula (XI) or a mixture of thiophenes of the general formulae (III) and (IV) or a mixture of thiophenes of the general formula (III) and (XI), or a mixture of thiophenes of the general formula (IV) and (XI) or a mixture of thiophenes of the general formula (III), (IV) and (XI)

(III)

(IV)

(XI)

in which

A is an optionally substituted $C_1$-$C_5$-alkylene radical, preferably an optionally substituted $C_2$-$C_3$-alkylene radical,

R is a linear or branched, optionally substituted $C_1$-$C_{18}$-alkyl radical, preferably linear or branched, optionally substituted $C_1$-$C_{14}$-alkyl radical, an optionally substituted $C_5$-$C_{12}$-cycloalkyl radical, an optionally substituted $C_6$-$C_{14}$-aryl radical, an optionally substituted $C_7$-$C_{18}$-aralkyl radical, an optionally substituted $C_1$-$C_4$-hydroxyalkyl radical, preferably optionally substituted $C_1$-$C_2$-hydroxyalkyl radical, or a hydroxyl radical, x is an integer of 0 to 8, preferably of 0 to 6, more preferably 0 or 1 and, in the case that a plurality of R radicals is bonded to A, they may be the same or different.

Particularly preferred monomeric precursors are optionally substituted 3,4-ethylenedioxhiophenes.

Examples of substituted 3,4-ethylenedioxythiophenes include the compounds of the general formula (V)

(V)

in which
R and x are each as defined for the general formulae (III) and (IV).

In the context of the invention, derivatives of these monomeric precursors are understood, for example, to mean dimers or trimers of these monomeric precursors. Also possible as derivatives are higher molecular weight derivatives, i.e. tetramers, pentamers, etc., of the monomeric precursors.

Examples of derivatives of substituted 3,4-alkylenedioxythiophenes include the compounds of the general formula (VI)

(VI)

in which
n is an integer of 2 to 20, preferably 2 to 6, more preferably 2 or 3,
and
A, R and x are each as defined for the general formulae (III) and (IV).

The derivatives may be formed either from identical or different monomer mixtures and be used in pure form or in a mixture with one another and/or with the monomeric precursors. Oxidized or reduced forms of these precursors are, in the context of the invention, encompassed by the term "precursors", provided that their polymerization forms the same conductive polymers as for the precursors detailed above.

Useful substituents for the above-specified precursors, especially for the thiophenes, preferably for the 3,4-alkylenedioxythiophenes, include the radicals specified for the general formulae (III), (IV) or (XI) for R.

Optional further substituents of the A and/or the R radicals include the organic groups specified in connection with the general formulae (I), (II) or (X).

Processes for preparing the monomeric precursors for the preparation of conductive polymers and the derivatives thereof are known to those skilled in the art and are described, for example, in L. Groenendaal, F. Jonas, D. Freitag, H. Pielartzik & J. R. Reynolds, Adv. Mater. 12 (2000) 481-494 and literature cited therein.

The 3,4-alkyleneoxythiathiophenes of the formula (III) required for the preparation of the polythiophenes to be used are known to those skilled in the art or are preparable by known processes (for example according to P. Blanchard, A. Cappon, E. Levillain, Y. Nicolas, P. Frere and J. Roncali, Org. Lett. 4 (4), 2002, S. 607-609).

The thieno[3,4-b]thiophene of the formula (XI) required for the preparation of the polythiophenes to be used are known to those skilled in the art or are preparable by known processes (for example according to US2004/0074779A1).

The dispersions are prepared from the above-described precursors, for example, analogously to the conditions specified in EP-A 440 957. An improved variant for the preparation of the dispersions is that of using ion exchangers to remove the inorganic salt content or a portion thereof. Such a variant is described, for example, in DE-A 19627071. The ion exchanger can, for example, be stirred with the product, or the product is conducted through a column filled with ion exchange resin. The use of the ion exchanger allows, for example, the above-described low metal contents to be achieved.

The particle size of the particles B) in dispersion A) can be reduced, for example, by means of a high pressure homogenizer. This operation can also be repeated in order to enhance the effect. In particular pressures between 100 and 2000 bar have been found to be particularly advantageous in order to reduce the particle size.

Preparation of a polythiophene/polyanion complex and subsequent dispersion or redispersion in one or more solvent(s) is also possible.

The particles B) of the conductive polymer preferably form a stable dispersion. However, it is also possible to use unstable dispersions, by virtue of them being, for example, stirred, rolled or shaken up before use, in order to ensure homogeneous distribution of the particles B).

The dispersions A) are applied to the dielectric of the electrode body by known processes, for example by spin-coating, impregnating, casting, dropwise application, spraying, knife-coating, painting or printing, for example inkjet printing, screenprinting or pad printing.

The introduction of the dispersion into the porous electrode body can be facilitated, for example, by means of elevated or reduced pressure, vibration, ultrasound or heat.

The application to the dielectric of the electrode body can be effected directly or using an adhesion promoter, for example a silane, for example organofunctional silanes or hydrolysates thereof, e.g. 3-glycidoxypropyltrialkoxysilane, 3-aminopropyltriethoxysilane, 3-mercaptopropyltrimethoxysilane, 3-methacryloyloxypropyltrimethoxysilane, vinyltrimethoxysilane or octyltriethoxysilane, and/or one or more other functional layers.

After the dispersion A) has been applied, the dispersant D) is preferably removed, in order that the particles B) and any further additives in the dispersion of the solid electrolyte can form the polymeric intermediate layer or the polymeric outer layer. However, it is also possible for at least a portion of the dispersant D) to remain in the solid electrolyte.

The dispersant D) can be removed after the dispersion has been applied by simple evaporation at room temperature. To achieve higher processing speeds, it is, however, more advantageous to remove the dispersants D) at elevated temperatures, for example at temperatures of 20 up to 300° C., preferably 40 up to 250° C. A thermal aftertreatment can be undertaken directly with the removal of the solvent or else at a different time from the completion of the coating.

Depending on the kind of dispersion used for the coating, the duration of the heat treatment is 5 seconds to several hours. For the thermal treatment, it is also possible to use temperature profiles with different temperatures and residence times.

The thermal treatment can be performed, for example, in such a way that the coated oxidized electrode bodies are moved through a heated chamber at the desired temperature at such a speed that the desired residence time at the selected temperature is achieved, or contacted with a hotplate at the desired temperature for the desired residence time. In addition, the thermal treatment can, for example, be effected in an oven or several ovens with different temperatures.

According to the type of oxidized electrode body, it may be advantageous to impregnate the oxidized electrode bodies with the dispersions once or more than once again, in order to achieve thicker polymers and/or a greater coverage of the dielectric surface layer.

The application of the dispersion A) and the at least partial removal of the dispersant D) are effected repeatedly.

The coverage of the dielectric with the solid electrolyte can be determined as follows: The capacitance of the capacitor is measured in the dry and moist state at 120 Hz. The degree of coverage is the ratio of the capacitance in the dry state to the capacitance in the moist state, expressed in percent. "Dry state" means that the capacitor has been dried at elevated temperature (80-120° C.) over several hours, before it is analysed. "Moist state" means that the capacitor has been exposed to saturated air humidity under elevated pressure, for example in a steam boiler, over several hours. In the course of this, the moisture penetrates into the pores not covered by the solid electrolyte, and acts there as a liquid electrolyte.

The coverage of the dielectric by the solid electrolyte is preferably greater than 50%, more preferably greater than 70%, most preferably greater than 80%.

After production of the solid electrolyte, it is possible to apply further conductive layers, for example a conductive outer layer, on the capacitor body. Preference is given to applying a polymeric outer layer, for example as described in European patent application EP-A 1 524 678. Further layers with good conductivity, for example graphite and/or silver layers, serve as current collectors. In wound capacitors, a cathode film which is separated from the capacitor body (anode film) by a separator serves as the current collector. Finally, the capacitor is optionally contact-connected and finally encapsulated.

The present invention further provides a dispersion comprising at least particles comprising an electrically conductive polythiophene, which is optionally substituted, and a dispersant, characterized in that, for the dispersion, the integral of the viscosity, which is represented as a function of the solids content, in the integration range from 0.4% solids to 5% solids, is less than 2500 mPas %, wherein the viscosity is determined with a rheometer in mPas at 20° C. and a shear rate of 100 s$^{-1}$, and the solids content is determined in percent, and in that the particles comprising a polythiophene, in the dry state, possess a specific electrical conductivity greater than 100 S/cm.

For the dispersion, the same preferred ranges apply as the preferred ranges detailed above for the dispersion A) from the process according to the invention.

The process according to the invention and the inventive dispersion thus enable the production of solid electrolyte capacitors with low equivalent series resistance (ESR) and low leakage current, in which no in situ polymerization is required. The process according to the invention is simpler than the process described in WO-A1-2007/031206 and achieves higher degrees of coverage with the solid electrolyte and hence higher capacitances. The electrolyte capacitors produced by the process according to the invention thus form a further part of the subject-matter of the present invention. The electrolyte capacitors produced in accordance with the invention are outstandingly suitable, owing to their low leakage current and their low ESR, for use as a component in electronic circuits, for example as filter capacitors or decoupling capacitors. The use also forms part of the subject-matter of the invention. Preference is given to electronic circuits, as present, for example, in computers (desktops, laptops, servers), in computer peripherals (e.g. PC cards), in portable electronic devices, for example mobile phones, digital cameras or amusement electronics, in devices for amusement electronics, for example in CD/DVD players and computer game consoles, in navigation systems, in telecommunications equipment, in domestic appliances, in voltage supplies or in automotive electronics. The examples which follow serve to illustrate the invention by way of example and should not be interpreted as a restriction.

EXAMPLES

Comparative Example 1

Preparation of a Dispersion a) of Conductive Polymers

A 2 l three-neck flask with stirrer and internal thermometer was initially charged with 868 g of deionized water, 330 g of an aqueous polystyrenesulphonic acid solution with a mean molecular weight of 70 000 and a solids content of 3.8% by weight. The reaction temperature was kept between 20 and 25° C. With stirring, 5.1 g of 3,4-ethylenedioxythiophene were added. The solution was stirred for 30 minutes. Subsequently, 0.03 g of iron(III) sulphate and 9.5 g of sodium persulphate were added and the solution was stirred for a further 24 h.

After the reaction had ended, inorganic salts were removed using 100 ml of a strongly acidic cation exchanger (Lewatit S100, Lanxess AG) and 250 ml of a weakly basic anion exchanger (Lewatit MP 62, Lanxess AG), and the solution was stirred for a further 2 h. The ion exchanger was filtered off. The poly(3,4-ethylenedioxythiophene)/polystyrenesulphonate dispersion was homogenized ten times at a pressure of 700 bar with a high-pressure homogenizer. 100 g of the dispersion and 4 g of dimethyl sulphoxide (DMSO) were mixed vigorously in a beaker with a stirrer to give a dispersion a). The solids content of dispersion a) was 1.2% and the viscosity was 15 mPas.

To determine the solids content, 5 g of the dispersion were dried at 100° C. for 14 hours.

Dispersion a) had the following particle size distribution:

| | |
|---|---|
| $d_{10}$ | 20 nm |
| $d_{50}$ | 28 nm |
| $d_{90}$ | 47 nm |

The diameter of the particles of the conductive polymer is based on a mass distribution of the particles in the dispersion as a function of particle diameter. The determination was effected by means of an ultracentrifuge measurement. The particle size was determined in the swollen state of the particles.

The dispersion a) was adjusted to different solids contents by dilution with water or concentration, and the particular viscosity of the dispersion was determined at a shear rate of 100 Hz and 20° C. with a rheometer (Haake).

The values can be found in Table 1.

TABLE 1

Dispersion a

| Solids content [%] | Viscosity [mPas] |
|---|---|
| 0.40 | 3 |
| 0.80 | 8 |
| 1.20 | 15 |
| 1.60 | 31 |
| 1.90 | 44 |
| 2.20 | 93 |
| 2.70 | 173 |
| 3.00 | 230 |
| 4.00 | 875 |
| 5.00 | 2940 |

The integral of the viscosity of the dispersion a) in the integration range from 0.4% to 5% was determined by means of the trapezoidal rule and was 2635 mPas×%.

Example 1

Preparation of a Dispersion b) of Conductive Polymers

Dispersion b) was prepared analogously to dispersion a) from comparative Example 1. However, the dispersion was concentrated to 2.2% solids after the high-pressure homogenization, then additionally homogenized another five times at a pressure of 1500 bar and subsequently diluted with water to a solids content of 1.25%. 100 g of the dispersion and 4 g of dimethyl sulfoxide (DMSO) were mixed vigorously in a beaker with a stirrer to give a dispersion b). The solids content of dispersion b) was 1.2% and the viscosity was 15 mPas.

The dispersion b) had the following particle size distribution:

| | |
|---|---|
| $d_{10}$ | 20 nm |
| $d_{50}$ | 29 nm |
| $d_{90}$ | 45 nm |

An ICP analysis of the metal contents of dispersion b) gave the following values:

| | |
|---|---|
| sodium (Na): | 100 mg/kg |
| magnesium (Mg): | 0.60 mg/kg |
| aluminium (Al): | 1.0 mg/kg |
| silicon (Si): | 1.1 mg/kg |
| phosphorus (P): | 6.2 mg/kg |
| potassium (K): | 0.63 mg/kg |
| calcium (Ca): | 3.9 mg/kg |
| chromium (Cr): | 0.18 mg/kg |
| iron (Fe): | 0.80 mg/kg |
| zinc (Zn): | <0.01 mg/kg |

A portion of dispersion b) was spun onto a microscope slide (26 mm×26 mm×1 mm) by means of a spin-coater (Chemat Technology KW-4A). The sample was dried at 120° C. for 10 min. Subsequently, two opposite edges of the microscope slide were coated with conductive silver. After the conductive silver had been dried, the two silver strips were connected to contacts and a Keithley 199 Multimeter was used to determine the surface resistivity. The layer thickness was determined with a Tencor Alpha Step 500 Surface Profiler. Surface resistivity and layer thickness d were used to determine specific conductivity σ according to $\sigma=1/(R_\square \times d)$. The layer thickness was 60 nm and the specific conductivity was 450 S/cm.

Dispersion b) was adjusted to different solids contents by dilution with water or concentration and the particular viscosity of the dispersion was determined with a rheometer (Haake) at a shear rate of 100 Hz and 20° C. The values can be found in Table 2.

TABLE 2

Dispersion b

| Solids content [%] | Viscosity [mPas] |
|---|---|
| 0.40 | 3 |
| 0.80 | 8 |
| 1.20 | 15 |
| 1.80 | 27 |
| 2.20 | 41 |
| 2.60 | 68 |
| 3 | 95 |
| 4.00 | 353 |
| 5.00 | 1129 |
| 5.20 | 1428 |

The integral of the viscosity of dispersion b) in the integration range from 0.4% to 5% was determined by means of the trapezoidal rule and was 1052 mPas×%.

Example 2

Preparation of a Dispersion c) of Conductive Polymers

Dispersion c) was prepared analogously to dispersion b) from Example 1. However, the second homogenization was effected at a pressure of 2500 bar. The solids content of dispersion c) was 1.2% and the viscosity was 7 mPas.

The dispersion c) had the following particle size distribution:

| | |
|---|---|
| $d_{10}$ | 19 nm |
| $d_{50}$ | 27 nm |
| $d_{90}$ | 48 nm |

Dispersion c) was adjusted to different solids contents by dilution with water or concentration and the particular viscosity of the dispersion was determined with a rheometer (Haake) at a shear rate of 100 Hz and 20° C. The values can be found in Table 3.

TABLE 3

Dispersion c

| Solids [%] | Viscosity [mPas] |
|---|---|
| 0.40 | 2.5 |
| 0.80 | 4.5 |
| 1.20 | 7 |
| 1.60 | 12 |
| 2.00 | 20 |
| 2.30 | 28 |
| 3.00 | 45 |
| 4.10 | 167 |
| 5.00 | 363 |
| 5.80 | 536 |

The integral of the viscosity of dispersion c) in the integration range from 0.4% to 5% was determined by means of the trapezoidal rule and was 402 mPas×%.

Figure 5:
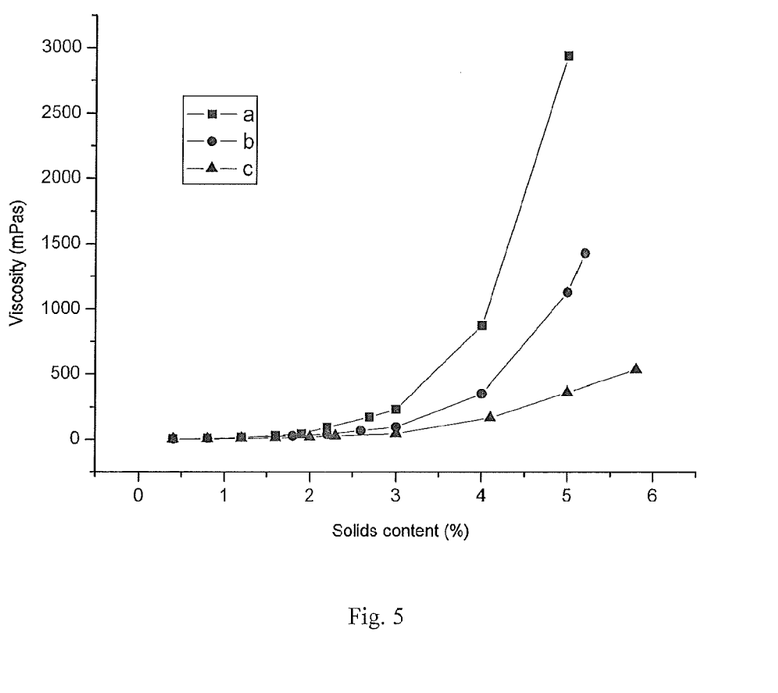
FIG. 5 shows the plot of the viscosity of the dispersions a), b) and c) as a function of the solids content.

FIG. 5 shows the plot of the viscosity of the dispersions a), b) and c) as a function of the solids content.

The viscosities of all three dispersions rise significantly at higher solids contents. However, the rise does not occur until significantly higher solids contents for inventive dispersions b) and c) compared to dispersion a). The integral of the viscosity for dispersions b) and c) in the integration range of 0.4-5%, at 1052 mPas×% and 402 mPas×% respectively, is significantly lower than the corresponding integral for dispersion a), which is 2635 mPas×%.

Example 3

3.1. Production of Oxidized Electrode Bodies:

Tantalum powder with a specific capacitance of 150 000 μFV/g was pressed with incorporation of a tantalum wire to pellets and sintered, in order to form an electrode body with dimensions 2.2 mm×1.1 mm×1.1 mm. The porous electrode bodies were anodized to 12 V in a phosphoric acid electrolyte to form a dielectric.

3.2 Production of the Solid Electrolyte

The oxidized electrode bodies were impregnated in dispersion b) for 1 min. This was followed by drying at 120° C. for 10 min. Impregnation and drying were carried out 19 more times.

3.3 Production of a Polymeric Outer Layer

Dispersion d):

A 5 l glass reactor with stirrer and thermometer was initially charged with 2.5 l of demineralized water. While stirring, 214.2 g p-toluenesulfonic acid monohydrate and 2.25 g of iron(III) sulphate heptahydrate were introduced. Once everything had dissolved, 85.8 g of 3,4-ethylenedioxythiophene were added and the mixture was stirred for 30 minutes. Subsequently, 192.9 g of sodium peroxodisulphate were introduced with stirring and the mixture was stirred at room temperature for a further 24 hours. After the reaction had ended, the PEDT/toluenesulphonate powder formed was filtered off on a porcelain suction filter, washed with 3 l of demineralized water and finally dried at 100° C. for 6 hours. 89 g of a blue-black PEDT-toluenesulphonate powder were obtained.

A 5 l glass reactor with stirrer and thermometer was initially charged with 1736 g of deionized water, 660 g of an aqueous polystyrenesulphonic acid solution with a mean molecular weight $M_w$ of 70 000 and a solids content of 3.8% by weight. The reaction temperature was kept between 20 and 25° C. With stirring, 10.2 g of 3,4-ethylenedioxythiophene were added. The solution was stirred for 30 minutes (min). Subsequently, 0.06 g of iron(III) sulphate and 19 g of sodium persulphate were added and the solution was stirred for a further 24 hours (h). After the reaction had ended, inorganic salts were removed using 200 ml of a strongly acidic cation exchanger (Lewatit S100, Lanxess AG) and 500 ml of a weakly basic anion exchanger (Lewatit MP 62, Lanxess AG), and the solution was stirred for a further 2 h. The ion exchanger was filtered off. A beaker with a stirrer was initially charged with 180 g of this PEDT/PSS dispersion, 10 g of a sulphopolyester (Eastek 1100, solids content 30%, Eastman), 8 g of dimethyl sulphoxide, 1 g of 3-glycidoxypropyltrimethoxysilane (Silquest A-187, OSi Specialties) and 0.4 g of wetting agent (Dynol 604, Air Products) were mixed vigorously for one hour. Subsequently, 2 g of the PEDT/toluenesulphonate powder were dispersed in by means of a ball mill dissolver unit. To this were added 300 g of zirconium oxide beads (Ø 1 mm) and the mixture was stirred while cooling with water at 7000 rpm for 1 hour. Finally, the milling beads were removed by means of a 0.8 μm screen. This resulting dispersion d) had a solids content of 4.7% and a viscosity of 200 mPas. The specific conductivity was 90 S/cm.

The capacitor bodies were impregnated in dispersion d) from Example 1 and then dried at 120° C. for 10 min.

Finally, the electrode bodies were coated with a graphite and silver layer.

The mean electrical values of the 10 capacitors manufactured in the above manner can be found in Table 4. The capacitance (in microfarads) was measured at 120 Hz and the equivalent series resistance (ESR) (in milliohms) at 100 kHz by means of an LCR meter (Agilent 4284A).

Example 4

10 capacitors were manufactured analogously to Example 3, except that dispersion c) from Example 2 was used to produce the solid electrolyte instead of dispersion b).

The mean electrical values of the capacitors can be found in Table 4.

Comparative Example 2

10 capacitors were manufactured analogously to Example 3, except that dispersion a) from Comparative Example 1 was used to produce the solid electrolyte instead of dispersion b).

The mean electrical values of the capacitors can be found in Table 4.

TABLE 4

| | Capacitance [μF] | Loss factor [%] | ESR [mΩ] | Leakage current [μA] |
|---|---|---|---|---|
| Example 3 (Dispersion b) | 49 | 8.5 | 137 | 4 |
| Example 4 (Dispersion c) | 91 | 5.1 | 134 | 4 |
| Comparative Example 1 (Dispersion a) | 17.5 | 9.6 | 145 | 7 |

Although dispersions a), b) and c) have similar viscosities when applied to the oxidized electrode bodies, capacitance values several times higher can be achieved with the inventive dispersions b) and c) than with the noninventive dispersion a).

Example 5

5.1. Production of Oxidized Electrode Bodies 10 porous aluminium foils of size 4 mm×4 mm were anodized at 20 V.

5.2 Production of the Solid Electrolyte 100 g of dispersion b) (from Example 1) and 0.5 g of 3-glycidoxypropyltrimethoxysilane (Silquest A-187, OSi Specialties) were mixed vigorously in a beaker with a stirrer. Subsequently, the pH of this dispersion was adjusted to a value of 6 by adding 2-dimethylaminoethanol.

The oxidized aluminium foils were impregnated in this dispersion for 1 min. This was followed by drying at 120° C. for 10 min. Drying and impregnation were carried out nine more times.

5.3 Production of a Polymeric Outer Layer

The capacitor bodies were impregnated in dispersion d) from Example 3 and then dried at 120° C. for 10 min.

Finally, the electrode bodies were coated with a graphite and silver layer.

The mean electrical values of the 10 capacitors manufactured in the above manner can be found in Table 5. The capacitance (in microfarads) was determined at 120 Hz and the equivalent series resistance (ESR) (in milliohms) at 100 kHz by means of an LCR meter (Agilent 4284A).

Example 6

10 capacitors were manufactured as in Example 5, except using dispersion c) from Example 2.

The mean electrical values of the nine capacitors manufactured in the above manner can be found Table 5.

Comparative Example 3

10 capacitors were manufactured as in Example 5, except using dispersion a) from Comparative Example 1.

The mean electrical values of the nine capacitors manufactured in the above manner can be found Table 5.

TABLE 5

| | Capacitance [mF] | ESR [mW] |
|---|---|---|
| Example 5 (Dispersion b) | 13 | 20 |
| Example 6 (Dispersion c) | 15 | 19 |
| Comparative Example 3 (Dispersion a) | 6 | 23 |

The capacitors from Examples 5 and 6 have a significantly higher capacitance than the capacitors of Comparative Example 3.

Example 7

7.1. Production of Oxidized Electrode Bodies

A porous aluminium foil which has been anodized to 92 V and is of dimensions 0.1 mm×130 mm×3 mm (anode foil) and a porous aluminium foil of dimensions 0.03 mm×145 mm×3 mm (cathode foil) are each provided with a contact wire, then wound together with two cellulose separator papers as shown in FIG. 4 and fixed with adhesive tape. 10 of these oxidized electrode bodies were produced. The separator paper of the oxidized electrode bodies was then carbonized in an oven at 300° C.

7.2 Production of the Solid Electrolyte 100 g of dispersion b) (from Example 1) and 0.1 g of wetting agent (Dynol 604, Air Products) were mixed vigorously in a beaker with a stirrer. Subsequently, the pH of this dispersion was adjusted to a value of 6 by adding 2-dimethylaminoethanol.

The oxidized electrode bodies were impregnated in this dispersion for 15 min. This was followed by drying at 150° C. for 40 min. Impregnation and drying were carried out twice more.

The mean electrical values of the 10 capacitors manufactured in the above manner can be found Table 6. The capacitance (in microfarads) was determined at 120 Hz and the equivalent series resistance (ESR) (in milliohms) at 100 kHz by means of an LCR meter (Agilent 4284A).

Example 8

10 capacitors were manufactured as in Example 7, except using dispersion c) from Example 2.

The mean electrical values of the 10 capacitors manufactured in the above manner can be found Table 6.

Comparative Example 4

10 capacitors were manufactured as in Example 6, except using dispersion a) from Comparative Example 1.

The mean electrical values of the 10 capacitors manufactured in the above manner can be found Table 6.

TABLE 6

|   | Capacitance [mF] | ESR [mW] |
|---|---|---|
| Example 7 (Dispersion b) | 36 | 290 |
| Example 8 (Dispersion c) | 40 | 280 |
| Comparative Example 4 (Dispersion a) | 13 | 763 |

The capacitors from Examples 7 and 8 have a significantly higher capacitance and a lower ESR than the capacitors of Comparative Example 4.

The invention claimed is:

1. A process for producing an electrolyte capacitor, at least comprising, that
    a) applying a dispersion A) onto a porous body, at least comprising
       a porous electrode body of an electrode material and a dielectric which covers the surface of this electrode material,
       wherein said dispersion A) comprises at least particles B) of an electrically conductive polythiophene, which is optionally substituted and a dispersant D),
    b) and forming a solid electrolyte which partly or fully covers the dielectric surface by at least partly removing the dispersant D),
wherein for the dispersion A), the integral of the viscosity, which is represented as a function of the solids content, in the integration range from 0.4% solids to 5% solids, is less than 2500 mPas %, wherein the viscosity is determined with a rheometer in mPas at 20° C. and a shear rate of 100 s$^{-1}$, and the solids content is determined in percent.

2. The process according to claim 1, wherein the particles B) of dispersion A) in the dry state have a specific electrical conductivity of greater than 100 S/cm.

3. The process according to claim 1, wherein the particles B) of the conductive polymer in dispersion A) have a mean diameter of 1-100 nm.

4. The process according to claim 1, wherein the dispersion A) has a metals content of less than 5000 mg/kg.

5. The process according to claim 1, wherein the particles B) in dispersion A) comprise at least one polythiophene with repeat units of the general formula (I) or of the general formula (II) or of the general formula (X) or repeat units of the formulae (I) and (II) or repeat units of the formulae (I) and (X) or repeat units of the formulae (II) and (X) or repeat units of the formulae (I), (II) and (X)

(I)

(II)

(X)

in which
A is an optionally substituted $C_1$-$C_5$-alkylene radical,
R is independently of each other H, a linear or branched, optionally substituted $C_1$-$C_{18}$-alkyl radical, an optionally substituted $C_5$-$C_{12}$-cycloalkyl radical, an optionally substituted $C_6$-$C_{14}$-aryl radical, an optionally substituted $C_1$-$C_4$-aralkyl radical, an optionally substituted $C_1$-$C_4$-hydroxyalkyl radical or a hydroxyl radical,
x is an integer of 0 to 8 and,
in the case that a plurality of R radicals is bonded to A, they may be the same or different.

6. The process according to claim 1, wherein the polythiophene in dispersion A) is poly(3,4-ethylenedioxythiophene).

7. The process according to claim 1, wherein the particles B) additionally comprise at least one polymeric anion.

8. The process according to claim 7, wherein the polymeric anion is an anion of a polymeric carboxylic or sulphonic acid.

9. The process according to claim 1, wherein the dispersion A) comprises, as the dispersant D), organic solvent, water or mixtures of organic solvent and water.

10. The process according to claim 1, wherein dispersion A) additionally comprises crosslinkers and/or surface-active substances and/or further additives.

11. The process according to claim 1, wherein the electrode material of the electrode body is a valve metal or a compound with electrical properties comparable to a valve metal.

12. The process according to claim 1, wherein for the dispersion A), the integral of the viscosity, which is represented as a function of the solids content, in the integration range from 0.4% solids to 5% solids, is less than 2000 mPas %.

13. The process according to claim 1, wherein for the dispersion A), the integral of the viscosity, which is represented as a function of the solids content, in the integration range from 0.4% solids to 5% solids, is less than 1500 mPas %.

14. The process according to claim 1, wherein for the dispersion A), the integral of the viscosity, which is represented as a function of the solids content, in the integration range from 0.4% solids to 5% solids, is less than 1100 mPas %.

15. The process according to claim 1, wherein for the dispersion A), the integral of the viscosity, which is represented as a function of the solids content, in the integration range from 0.4% solids to 5% solids, is less than 600 mPas %.

* * * * *

UNITED STATES PATENT AND TRADEMARK OFFICE
CERTIFICATE OF CORRECTION

PATENT NO.         : 8,696,768 B2                                               Page 1 of 1
APPLICATION NO.    : 12/993998
DATED              : April 15, 2014
INVENTOR(S)        : Merker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 425 days.

Signed and Sealed this

Twenty-ninth Day of September, 2015

Michelle K. Lee
*Director of the United States Patent and Trademark Office*